Figure 12:
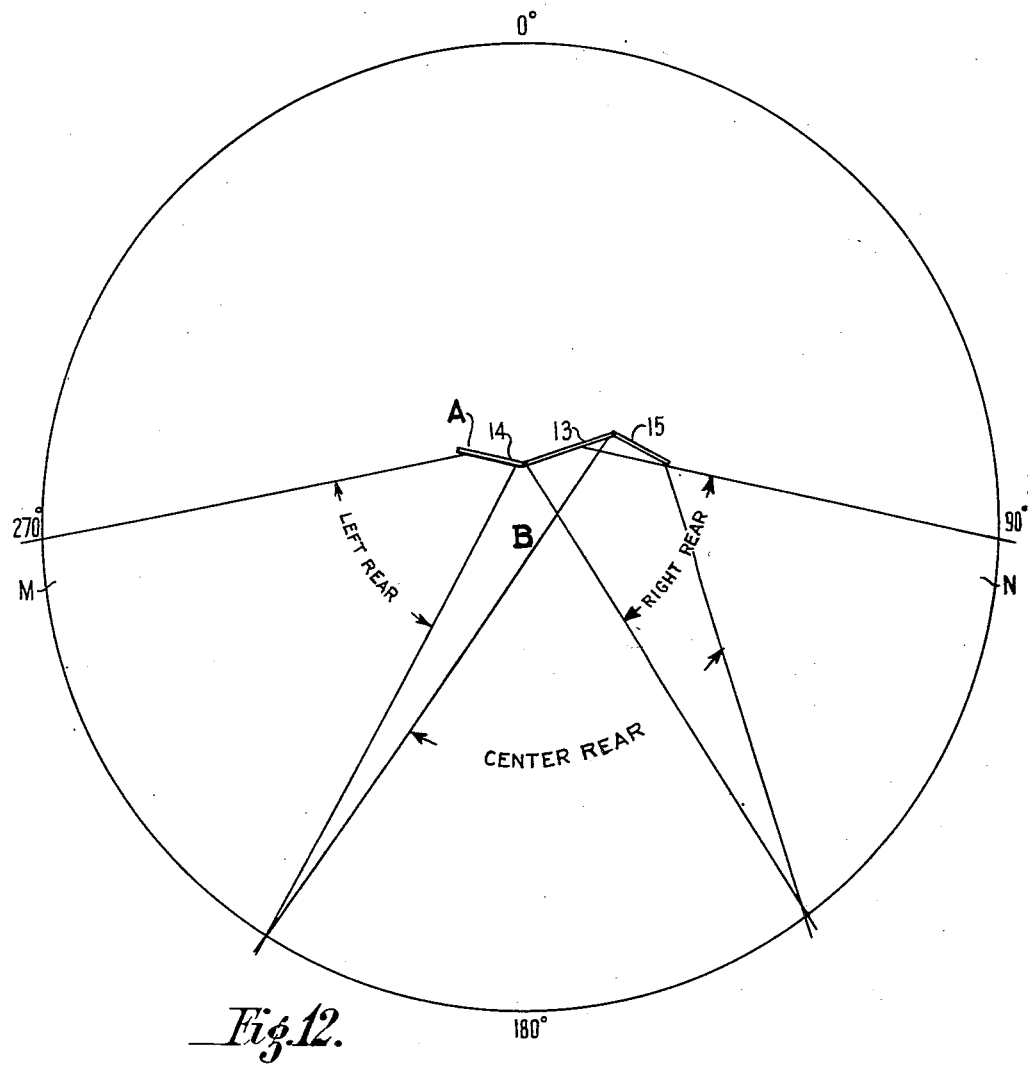

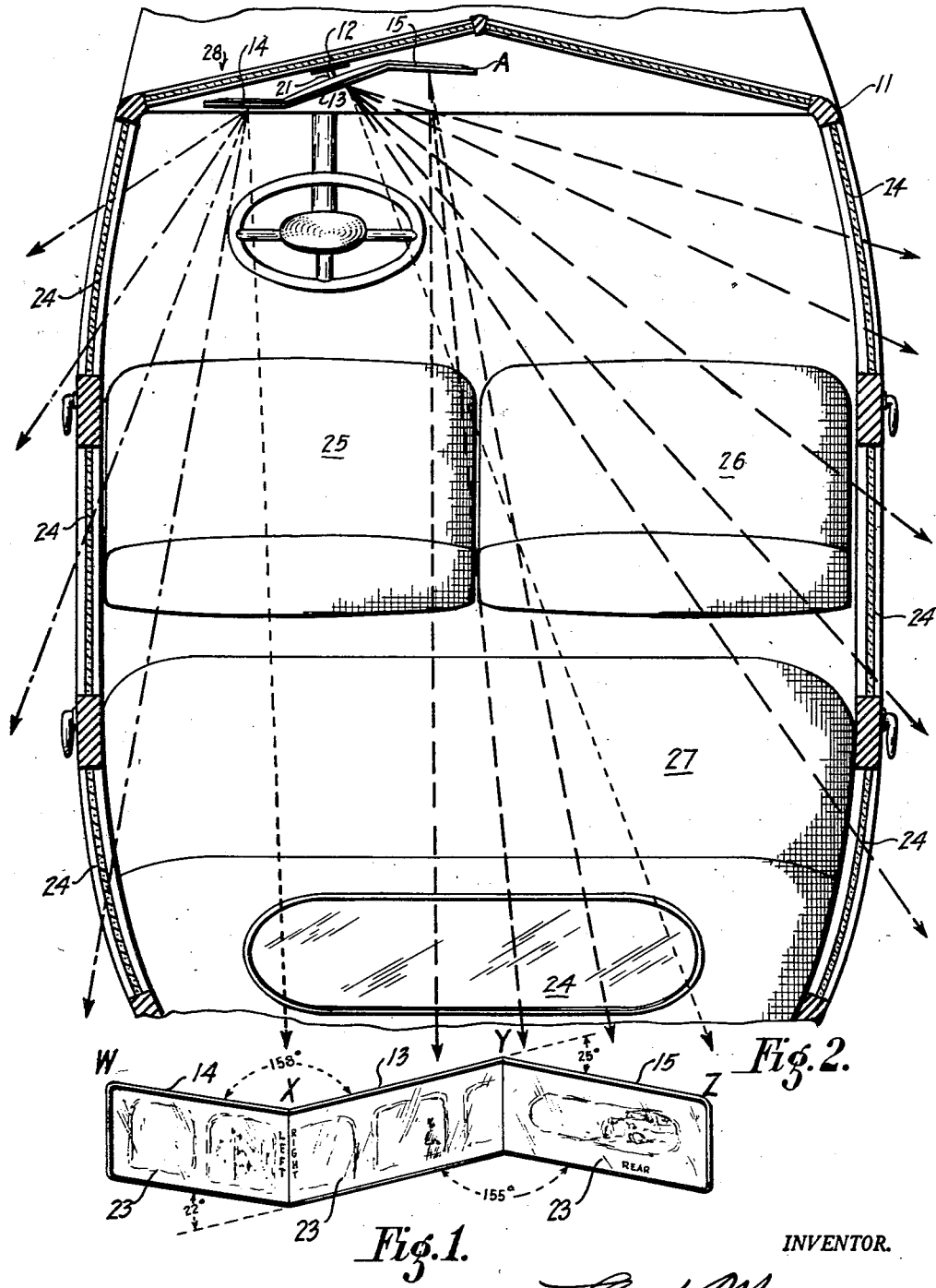

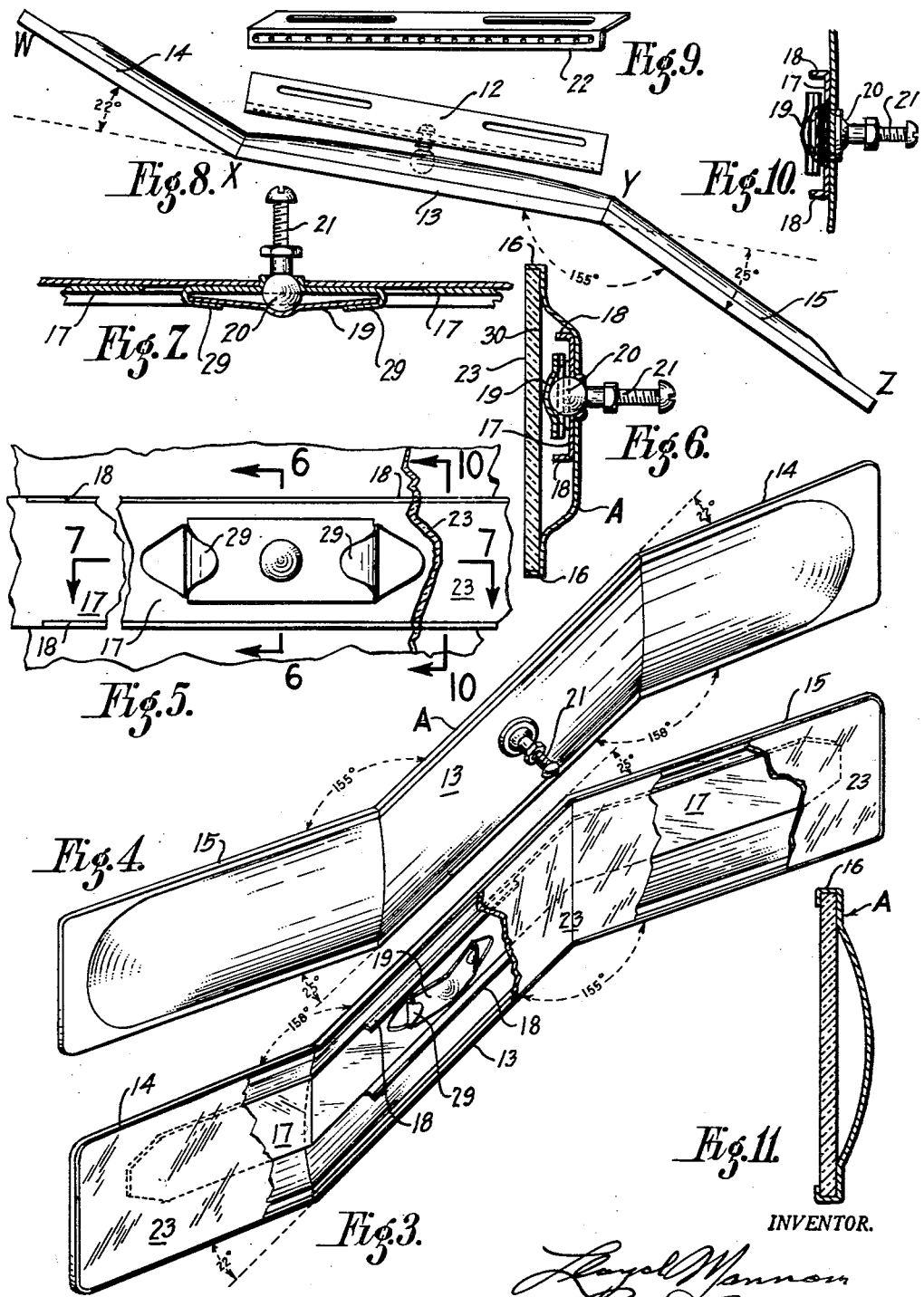

United States Patent Office 2,780,959
Patented Feb. 12, 1957

2,780,959

REARVIEW MIRRORS

Lloyd Mannon, Palo Alto, Calif.

Application June 27, 1952, Serial No. 295,979

2 Claims. (Cl. 88—87)

This invention relates to improvements in mirrors and has particular reference to a rearview mirror for motor vehicles. In the use of rear view mirrors with which most vehicles are equipped, it is necessary for the driver to take his eyes away from the road and the traffic in front in order to determine the position of cars on each side and to the rear. Considerable danger is involved in this procedure, for the driver must first look into the mirror to determine what is directly behind him, then turn his head 90 degrees to the right to see what is on the right and then turn back 180 degrees to see on the left and then 90 degrees back to the front. During all of the time required for this activity, the traffic pattern in front can change enough to result in a serious wreck. Other mirrors in use whose object it is to show a better view to the driver's rear, only serve to confuse the driver and add to the danger. Some confuse by showing a vehicle to the rear, right or left in more than one mirror. Curved surface mirrors confuse by distorting what they reflect so as to present a completely unrealistic picture with which the driver cannot coordinate himself.

With the above conditions in mind, I have produced a rearview mirror for vehicles that has for its principal object the provision of a reflecting medium whereby it is possible for the driver to determine at a glance the position of his vehicle in relation to any other vehicle to his rear, his right or right rear, his left or his left rear. The new and novel features of construction and combinations of parts eliminate all possibilities of confusion to the driver and enables the driver to have at all times a clear, unobstructed view of the left rear, right rear and the center rear, without looking to the right or left.

Another object of my invention is the provision of a new and novel construction which provides a view of a complete arc with three fixed surfaces. The relation of one to the other is such that when the view in one is the desired one, the view in the others will be correct, thus there is no individual adjustment for each mirror.

Another object of my invention is to provide a view of a complete arc by using a rear view mirror with a plurality of flat surfaces placed on one adjustable mounting, and making fixed angles with respect to each other so that the entire view may be adjusted with a single adjustment.

Another object of my invention is to obtain a view of a complete arc on a plurality of flat surfaces so as to eliminate any distortion such as is found in curved surfaces.

Another object of my invention is to provide a rear view of a complete arc with a mirror most convenient to the driver which still eliminates the possibility of either the driver or passenger interfering with the line of vision. Thus the flat mirror surface reflecting the view straight back through the rear window is placed at the right of the other two flat mirror surfaces reflecting the right rear and the left rear.

A further object of the invention is the provision of a mirror of the character described that is simple in construction, economical to manufacture, strong, durable and highly efficient and serviceable in use.

Other objects and advantages will be apparent during the course of the following description.

In the accompanying drawings forming a part of this specification and in which like numerals are employed to designate like parts throughout the same, Fig. 1 is a perspective view of the invention disclosing to advantage the fixed angular relationship of the mirrors, Fig. 2 is a top plan view of the rear view mirror located in a motor vehicle, and illustrating to advantage by the arrows, the view reflected to the driver, Fig. 3 is a perspective view partly in section and disclosing the front of the mirror, Fig. 4 is a perspective view of the rear of the rearview mirror, Fig. 5 is a fragmentary front elevational view of the ball and spring retaining clip, Fig. 6 is a transverse vertical sectional view through the mirror, the view being taken on line 6—6 of Fig. 5, Fig. 7 is a horizontal section through Fig. 5, the view being taken on line 7—7 of Fig. 5, Fig. 8 is a top plan view of the rear view mirror and disclosing the same as connected to the bracket of the invention, Fig. 9 is a perspective view of the bracket, per se., Fig. 10 is a transverse vertical section through Fig. 5, the view being taken on the line 10—10 of Fig. 5, Fig. 11 is a sectional view of a modified form of flange for retaining the mirror, and Fig. 12 is a schematic view of the visual pattern reflected by the mirror.

In the accompanying drawings wherein for the purpose of illustration is shown the preferred embodiment of the invention, the numeral 11 indicates, as a whole, the body of an automobile and the numeral 12 a bracket to which my improved mirror is secured, the bracket in turn being suitably connected to the body of the vehicle and forward of the driver of the motor vehicle.

The mirror per se consists of three surfaces, an intermediate mirror portion 13 and two end mirror portions 14 and 15, as disclosed to advantage in Figs. 3 and 4. These three portions define right rear, left rear and center rear viewing media. It will be noted that the plane of the mirrors in relation to each other is such that when an object is seen in one mirror, the object's exact location is indicated and it is seen only in the one mirror until its position in relation to the driver changes. For example, another vehicle seen in the rear from mirror 15 does not show in the mirrors that are used for left or right rear viewing. Should the vehicle being viewed from the mirror 15 move to pass on either the right or left, its reflection leaves or will pass from the rear viewing mirror and it is seen in its proper position on either the right mirror portion 13 or the left mirror portion 14.

The preferred arrangement of the respective mirror surfaces is that shown in Fig. 8. In Fig. 8 the deflection angle between the reflection surfaces of mirror 13 and mirror 14 proceeding from Y to W is approximately 22 degrees to the right, with the point X constituting the center of the arc. The deflection angle between reflecting surfaces 13 and 15 proceeding from X through Y to Z is right approximately 25 degrees, with the point Y constituting the center of the arc. Thus, the three mirrors are positioned in a fixed angular relationship to each other. When looking at the front of the mirror, as in Figure 3, the right-hand mirror section 15 makes an angle of 155 degrees, with the central mirror section 13, and the left-hand mirror section 14 makes an obtuse angle of 202 degrees, with the central mirror section. By virtue of this arrangement a definite and positive reflecting media is presented that requires no individual adjustment for each mirror and whereby a clear unobstructed view through a complete arc of 180°, to the rear is readily available to the driver at all times.

The three mirrors 13, 14 and 15, as disclosed in Fig. 1 are retained in a unitary metallic frame that is bulged rearwardly (Fig. 4). This bulge throughout the greater portion of its length is for the purpose of uniformity and attractiveness, the central portion of this bulge shields the ball and socket pivot of the invention.

The ball 20 is retained under tension in a socket like arrangement comprising the spring 19 and the spring retaining clip 17, the shank of the ball protruding through the retaining clip 17 and the metallic frame A. The metal tabs 29 are punched out from the metal strip 17 and bent over to retain the spring under tension against the ball. The spring retaining clip 17 is extended the length of the frame to strengthen and brace that member.

The reflecting surface 23 is clear glass. On the back or inside surface 30 of mirrors 13 and 14 there has been deposited a coating of silver to provide the reflecting medium. On the back of mirror 15 there has been deposited a coating of lead to produce a reflecting surface which will not reproduce the bright glare of headlights at night.

The glass is held in the frame A by adhesion or glueing the mirrors at the rim 16 and on the backing provided by the frame A. A modified form of retaining the mirrors by clamping the rim of the frame over the glass is shown in Fig. 11.

In Fig. 2 I have illustrated a top plan view looking into a motor vehicle. The conventional doors and windows are designated by the numeral 24 and the windshield as at 28. The driver's seat is 25, the front passenger seat 26 and the rear passenger seat 27. Numeral 11 designates the general body of the motor vehicle and the invention is mounted on the body at the top of the windshield in front of the driver. The ball shank and the screw 21 provide an easy mounting to any form of bracket or part of the body structure. Mounted thus, the invention, due to its design, is able to provide the driver with the unobstructed view to the rear which is needed for safe driving. In this position the rear viewing portion 15 is far enough towards the center of the vehicle to prevent the driver from interfering with the view, and at the same time the position towards the center increases the radii of the view picked up. The left viewing portion 14 is normal to the driver in that it is to the left. Also portion 14 is in a position where the body of the driver will not interfere with any of the important parts of the view to be picked up from the left.

The right viewing portion 13, due to its angle, is able to overcome any obstruction a passenger in seats 26 or 27 might provide to a complete view of the right rear. As can be seen by the lines radiating from portion 13, the view is of such wide scope that any interference caused by a passenger is of no consequence.

The conventional rear view mirror affords the driver of a vehicle a very limited view to the rear center. My invention, as shown by the arrows Fig. 2, provides a complete view of the left rear, right rear and center rear.

To better illustrate this feature and to clearly demonstrate how the picture is assembled and presented to the driver, refer to Fig. 12. This schematically illustrates a circle around a driver at B. The bearing of a line of vision directly ahead of the driver is taken as zero and the circle is divided into degrees running clockwise from zero. Ninety degrees is directly to the driver's right and 270 degrees directly to the left. An arc is depicted, running from N through 180° to M. My invention is located in front of the driver and the portion of the picture collected by each reflecting surface is set forth by lines leading to the circle or arc portion of the drawing.

Considering the picture reflected by my invention as a whole, and starting from the left, it will be seen that the left end portion of the arc from approximately 270 degrees to 205 degrees is reflected by portion 14. Then the opposite end of the arc from approximately 90 degrees to 155 degrees is reflected by portion 13, then the center part of the arc from approximately 155 degrees to 205 degrees is reflected by portion 15 of the invention. As a whole, this constitutes a clear, unconfusing picture to the rear.

It is to be understood that the form of my invention herewith shown and described is to be taken as a preferred example of the same and that various changes relative to the shape, size, material and arrangement of parts may be readily resorted to without departing from the spirit of the invention or the scope of the subjoined claims.

Having thus described my invention, I claim:

1. A rear view mirror for vehicles comprising: means for mounting the mirror in a vehicle in front of an observer seated in the vehicle; said mirror having a flat reflecting surface and being angularly related with respect to lines of sight from the observer to reflect images of objects to him that are located directly in back of the vehicle; said mirror having a second flat reflecting surface placed to the left of the first-mentioned flat reflecting surface when looking at the mirror and being angularly related with respect to lines of sight from the observer to reflect images of objects to him that are located at the right rear of the vehicle; and said mirror having a third flat reflecting surface placed to the left of the second-mentioned flat reflecting surface and being angularly related with respect to the lines of sight from the observer to reflect images of objects that are located at the left rear of the vehicle.

2. A rear view mirror for vehicles for permitting an observer to see in back and on both sides of him through an arc of substantially 180°: said mirror having a flat reflecting surface and being angularly related with respect to lines of sight from the observer to reflect images of objects to him that are located directly in back of the vehicle and known as the center rear portion of the arc; said mirror having a second flat reflecting surface placed to the left of the first-mentioned flat reflecting surface when looking at the mirror and being angularly related with respect to lines of sight from the observer to reflect images of objects to him that are located at the right rear of the vehicle and covering the right-hand side of the arc, starting at the right-hand edge of the center rear arc portion; and said mirror having a third flat reflecting surface placed to the left of the second-mentioned flat reflecting surface and being angularly related with respect to the lines of sight from the observer to reflect images of objects that are located at the left rear of the vehicle and covering the left-hand side of the arc, starting at the left-hand edge of the center rear arc portion; whereby the three arc portions will fill the entire 180° arc that lies in back and on both sides of the observer.

References Cited in the file of this patent
UNITED STATES PATENTS

| | | |
|---|---|---|
| 1,643,420 | Porter | Sept. 27, 1927 |
| 1,925,666 | Kerns | Sept. 5, 1933 |
| 2,168,003 | Stone | Aug. 1, 1939 |
| 2,514,989 | Buren | July 11, 1950 |
| 2,569,576 | Ramme | Oct. 2, 1951 |
| 2,605,676 | Couch | Aug. 5, 1952 |